United States Patent
Coop et al.

(10) Patent No.: US 8,897,949 B1
(45) Date of Patent: *Nov. 25, 2014

(54) AIRCRAFT REWORK MANAGEMENT

(71) Applicant: The Boeing Company, Chicago, IL (US)

(72) Inventors: William P. Coop, Buckley, WA (US); Jose R. Elias, Seattle, WA (US); Paul F. Seeger, Buckley, WA (US); Rebecca J. Shore, Seattle, WA (US); Tommy T. Nguyen, Seattle, WA (US); Edwin Keith Riner, Lynnwood, WA (US); James Don Knox, Issaquah, WA (US); Lois T. Hill, Renton, WA (US); David W. Allen, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 169 days.

This patent is subject to a terminal disclaimer.

(21) Appl. No.: 13/644,827

(22) Filed: Oct. 4, 2012

(51) Int. Cl.
*G01M 17/00* (2006.01)

(52) U.S. Cl.
USPC .................. 701/29.1; 701/29.4; 701/31.4

(58) Field of Classification Search
CPC ....... G07C 5/008; G07C 5/006; G01M 15/05; G01S 5/02
USPC .................... 701/29.1, 29.4, 31.4
See application file for complete search history.

(56) References Cited

U.S. PATENT DOCUMENTS

| | | | |
|---|---|---|---|
| 5,974,349 A * | 10/1999 | Levine | 701/29.6 |
| 6,618,654 B1 * | 9/2003 | Zaat | 701/31.9 |
| 7,545,270 B2 | 6/2009 | Pickering et al. | |
| 7,545,274 B2 | 6/2009 | Coop | |
| 7,548,802 B2 | 6/2009 | Avery et al. | |
| 7,551,086 B2 | 6/2009 | Coop et al. | |
| 2004/0039502 A1 * | 2/2004 | Wilson et al. | 701/29 |
| 2006/0055564 A1 * | 3/2006 | Olsen et al. | 340/994 |
| 2006/0248182 A1 * | 11/2006 | Glassco et al. | 709/223 |
| 2007/0112488 A1 * | 5/2007 | Avery et al. | 701/35 |
| 2007/0114280 A1 * | 5/2007 | Coop et al. | 235/385 |
| 2010/0023151 A1 * | 1/2010 | Shieh et al. | 700/105 |
| 2011/0298638 A1 * | 12/2011 | Groeneweg | 340/905 |
| 2012/0127924 A1 * | 5/2012 | Bandyopadhyay et al. | 370/328 |
| 2012/0150380 A1 * | 6/2012 | Whittaker | 701/29.4 |

OTHER PUBLICATIONS

Knox et al., "Aircraft Interior Component Maintenance," U.S. Appl. No. 13/782,475, filed Mar. 1, 2013, 47 pages.

Coop et al., "Maintaining the Airworthiness Configuration of Aircraft," U.S. Appl. No. 13/664,121, filed Oct. 30, 2012, 44 pages.

Office Action, dated May 30, 2014, regarding U.S. Appl. No. 13/664,121, 18 pages.

Office Action, dated May 30, 2014, regarding U.S. Appl. No. 13/782,475, 15 pages.

Final Office Action, dated Aug. 8, 2014, regarding U.S. Appl. No. 13/664,121, 13 pages.

Notice of Allowance, dated Aug. 13, 2014, regarding U.S. Appl. No. 13/782,475, 9 pages.

* cited by examiner

*Primary Examiner* — Hussein A. Elchanti (74) *Attorney, Agent, or Firm* — Yee & Associates, P.C.

(57) ABSTRACT

A method and apparatus for reworking a component on a vehicle. An inconsistency on the component is identified. The component is reworked to remove the inconsistency. Component rework information is stored on an automated identification technology tag attached to the vehicle. The component rework information comprises information describing the reworking of the component to remove the inconsistency.

19 Claims, 11 Drawing Sheets

| Item | Value |
|---|---|
| Initialized Date | 2011/03/04 |
| Tracking ID | 348920 |
| Corrosion Limits | 1 inch |
| Inspection Intervals | 3X/ month |
| Location (st, wl, bl) | 34,2,2 |
| Comments | This corrosion should be tracked at least until 2020 |

Record Repair- CPCP

Record Repair | Repair History

Menu | AS | RFID CMB

Attachments:
Photo01.jpg  Photo02.jpg
Photo03.jpg  Photo04.jpg
InstructionSheet.doc + Add Repair History

STRUCTURAL REPAIR REPORT

1100

Aircraft ID *  [3459333]

Inspection Program *  [-Select Inspection Program- ▼]

[Search]  2011/10/19  [Back]

| Aircraft ID | Program | Timestamp ▲ | Tracking ID | Correction Limit | Inspection Intervals | Location (sl, wl, bl) | Attachments | Comments | |
|---|---|---|---|---|---|---|---|---|---|
| ASA3783 | CPCP | 20110820 | 1002001 | 1 inch | 3x/month | 34,2,2 | File name.doc | Comments | Details |
| ASA3783 | Structural Repair | 20110815 | 2105020 | | 6x/year | 35,4,6 | Picture.jpg 35,4,6 | Comments | Details |

AIRCRAFT REWORK MANAGEMENT

BACKGROUND INFORMATION

1. Field

The present disclosure relates generally to the maintenance of components on aircraft and other vehicles. More particularly, the present disclosure relates to a system and method for using automated identification technology tags to manage the rework of components on aircraft.

2. Background

Aircraft may be maintained on a regular basis to ensure safe and efficient operation. Aircraft maintenance may be performed by following various maintenance procedures.

Procedures for maintaining an aircraft may include inspecting various components of the aircraft. For example, aircraft components may be inspected as part of a routine maintenance procedure to confirm that the components are present and are in working order. Aircraft components also may be inspected in response to an occurrence that might result in an inconsistency in the component. For example, aircraft components may be inspected in response to an emergency landing of the aircraft or in response to the aircraft striking an object or an object striking the aircraft.

An inspection of a component on an aircraft may indicate an inconsistency in the component. In some cases, the component may be reworked to remove the inconsistency. Currently, a technician reworking a component to remove an inconsistency may not be aware that the component was previously reworked or the extent to which the component was previously reworked. As a result, time and effort may be wasted in reworking the component.

Automated identification technology may be used to automatically identify objects, collect data about the objects, and enter that data directly into a computer system with little or no human involvement. Automated identification technology tags may be attached to various objects. Examples of automated identification technology tags may include radio frequency identification (RFID) tags and contact memory buttons. Information identifying the object and various characteristics of the object may be stored in the tags. This information may be read from the tags and automatically entered into a computer system for processing using an appropriate reader device. Such automated identification technology has not been fully utilized for the inspection and maintenance of aircraft.

Accordingly, it would be beneficial to have a method and apparatus that takes into account one or more of the issues discussed above as well as possibly other issues.

SUMMARY

An illustrative embodiment of the present disclosure provides a method for reworking a component on a vehicle. Component rework information is read from an automated identification technology tag attached to the vehicle. The component rework information comprises information identifying a history of rework of the component. The component rework information is displayed on a user interface.

Another illustrative embodiment of the present disclosure provides a method for reworking a component on a vehicle. An inconsistency on the component is identified. The component is reworked to remove the inconsistency. Component rework information is stored on an automated identification technology tag attached to the vehicle. The component rework information comprises information describing the reworking of the component to remove the inconsistency.

Another illustrative embodiment of the present disclosure provides an apparatus comprising a reader and a user interface. The reader is configured to read component rework information from an automated identification technology tag attached to a vehicle and to write changes to the component rework information to the automated identification technology tag attached to the vehicle. The component rework information comprises information identifying a history of rework of the component. The user interface is configured to display the component rework information on a user interface and to receive the changes to the component rework information from a user.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number", as used herein with reference to items, means one or more items. For example, "a number of different considerations" means one or more different considerations.

The different illustrative embodiments recognize and take into account that time and effort may be wasted reworking a component on an aircraft or other vehicle. For example, currently a technician may identify an inconsistency on a component and then rework the component to remove the inconsistency. After the component is reworked, the technician tests the component to verify that the component has not been reworked beyond proscribed limits. In cases where the component was previously reworked, it is more likely that the subsequent reworking will exceed the proscribed limits. In this case, the component may be replaced. Thus, the time and effort for reworking and testing the component is wasted.

In accordance with an illustrative embodiment, component rework information may be stored in an automated identification technology tag that is attached to the aircraft or other vehicle on or near a component of the aircraft or other vehicle. The component rework information may include information identifying a history of rework of the component. A technician may employ a hand held inspection device to read and display the component rework information before reworking the component. In some cases, the component rework information will indicate that the component should be replaced instead of being reworked. In these cases, unnecessary reworking and testing of the component may be avoided. If the component is reworked, the component rework information in the automated identification technology tag may be updated by changing the component rework information to include information on the reworking of the component.

Figure 1:
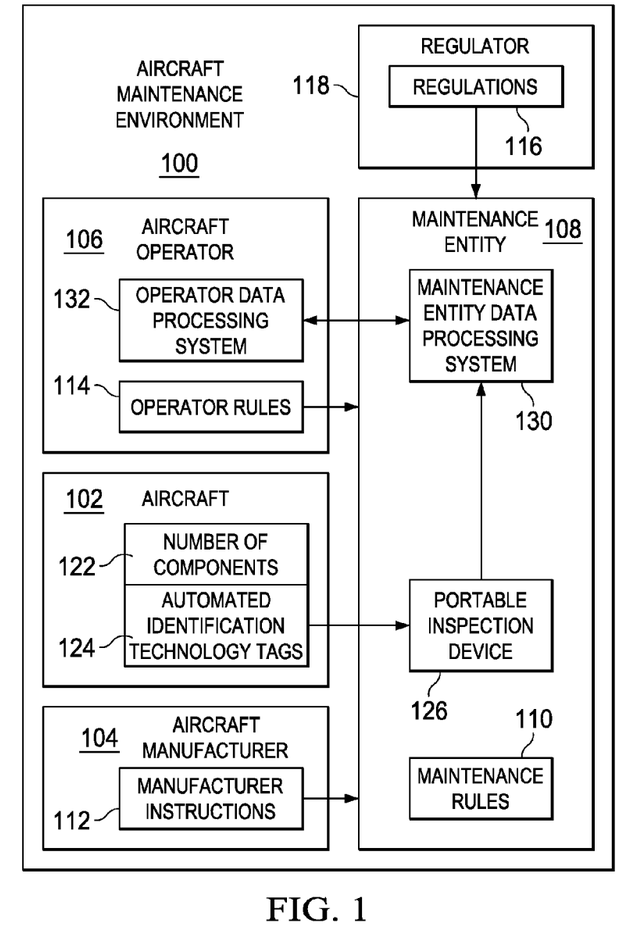
FIG. 1 is an illustration of a block diagram of an aircraft maintenance environment in accordance with an illustrative embodiment.

Turning now to FIG. 1, an illustration of a block diagram of an aircraft maintenance environment is depicted in accordance with an illustrative embodiment. In this illustrative example, aircraft maintenance environment 100 comprises aircraft 102. Aircraft 102 in aircraft maintenance environment 100 may be manufactured by aircraft manufacturer 104 and operated by aircraft operator 106. Aircraft 102 may include any type of commercial, military, or other aircraft. Aircraft operator 106 may be an airline, military or other government entity, or any other operator of aircraft 102.

Aircraft 102 may be maintained by maintenance entity 108. Maintenance entity 108 may be any entity for maintaining aircraft 102. For example, maintenance entity 108 may be aircraft operator 106 or a third party employed by aircraft operator 106 to maintain aircraft 102. For example, without limitation, maintenance entity 108 may include aircraft manufacturer 104.

Maintenance entity 108 may maintain aircraft 102 in accordance with maintenance rules 110. For example, maintenance rules 110 may define various procedures for inspecting and maintaining aircraft 102. Maintenance rules 110 may define part of a maintenance program for maintaining aircraft 102 in an airworthy condition. Maintenance rules 110 may define various rules for determining whether aircraft 102 is airworthy.

Maintenance rules 110 may be developed and provided to maintenance entity 108 from various sources. For example, maintenance rules 110 may include manufacturer instructions 112 provided by aircraft manufacturer 104. For example, without limitation, manufacturer instructions 112 may include instructions for continued airworthiness. These instructions may specify procedures for inspection, maintenance, repair, and replacement of various parts of aircraft 102. Maintenance rules 110 also may include operator rules 114 provided by aircraft operator 106 for the inspection and maintenance of aircraft 102.

Maintenance rules 110 may be developed by aircraft manufacturer 104, aircraft operator 106, another entity, or a combination of entities to satisfy regulations 116. Regulations 116 may be issued by regulator 118. For example, regulator 118 may be a government agency or other entity with authority to issue regulations 116.

Maintenance entity 108 may inspect and maintain number of components 122 of aircraft 102. For example, maintenance entity 108 may inspect number of components 122 to identify any inconsistencies in number of components 122 that may affect aircraft 102 in undesired manners. Number of components 122 may be reworked to remove any identified inconsistencies. Alternatively, number of components 122 with inconsistencies may be replaced. Whether number of components 122 with inconsistencies are reworked or replaced in particular situations may be defined by maintenance rules 110.

In accordance with an illustrative embodiment, automated identification technology tags 124 may be attached to aircraft 102. Automated identification technology tags 124 may include component rework information stored thereon. The component rework information may include information identifying a history of rework of number of components 122.

In accordance with an illustrative embodiment, portable inspection device 126 may be used by maintenance entity 108 to read the component rework information for number of components 122 from automated identification technology tags 124. This component rework information may be displayed on portable inspection device 126 and used by a technician to take appropriate actions in response to identifying inconsistencies in number of components 122. The component rework information stored in automated identification technology tags 124 may be updated using portable inspection device 126 after such appropriate action is taken. Such component rework information also may be stored and displayed by maintenance entity 108 in maintenance entity data processing system 130. Such component rework information also may be provided to operator data processing system 132 for storage and display by aircraft operator 106. For example, without limitation, component rework information may be provided from maintenance entity data processing system 130 to operator data processing system 132 via any appropriate network or other connection.

Figure 2:
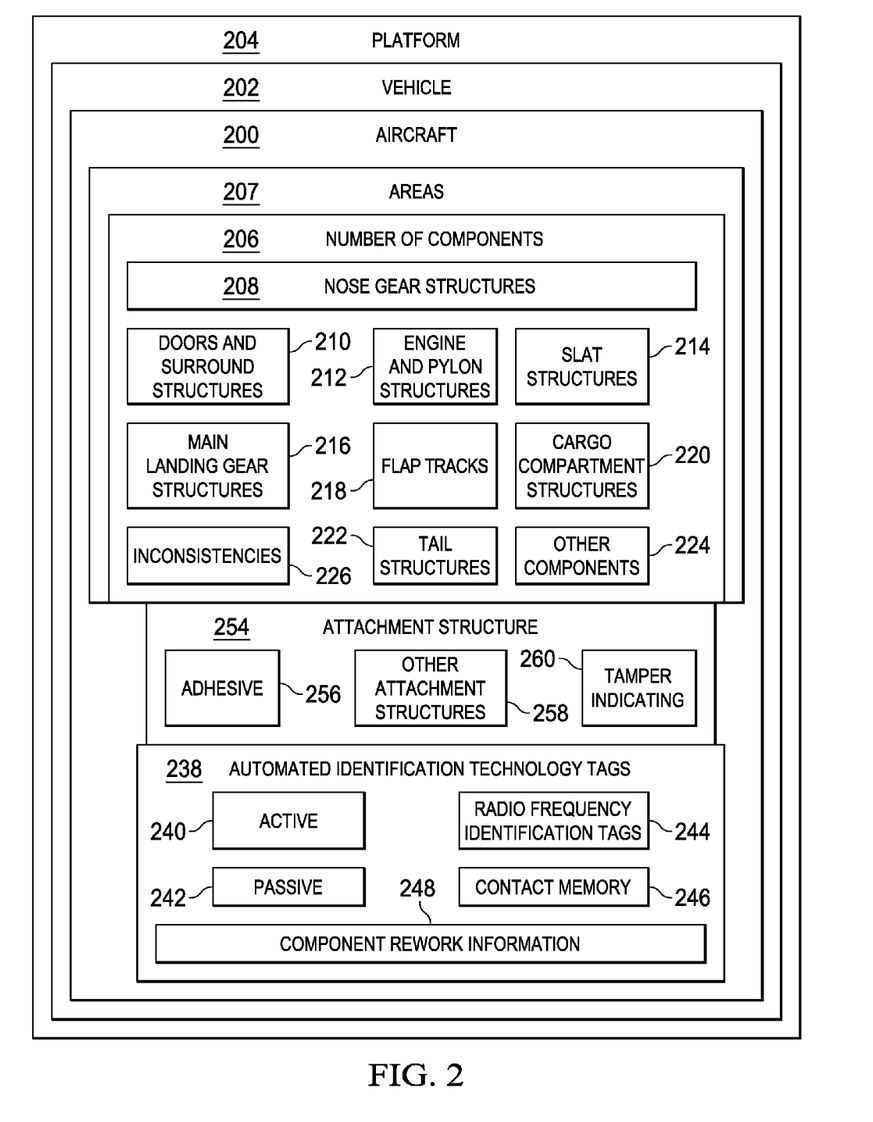
FIG. 2 is an illustration of a block diagram of an aircraft in accordance with an illustrative embodiment.

Turning now to FIG. 2, an illustration of a block diagram of an aircraft is depicted in accordance with an illustrative embodiment. In this example, aircraft 200 is an example of one implementation of aircraft 102 in FIG. 1.

Aircraft 200 is an example of vehicle 202. Illustrative embodiments may be used for the maintenance of vehicle 202 other than aircraft 200. Vehicle 202 may be any vehicle configured for operation in the air, in space, on land, on water, under water, or in any other medium or combinations of media.

Vehicle 202 is an example of platform 204. Illustrative embodiments may be used for the maintenance of platform 204 other than vehicle 202. For example, platform 204 may be any fixed or mobile structure.

Aircraft 200 may include number of components 206. Number of components 206 may include various parts of aircraft 200. Number of components 206 may be located in various areas 207 of aircraft 200. For example, without limitation, number of components 206 may include nose gear structures 208, doors and surround structures 210, engine and pylon structures 212, slat structures 214, main landing gear structures 216, flap tracks 218, cargo compartment structures 220, tail structures 222, and other components 224. Number of components 206 may also include inconsistencies 226.

Automated identification technology tags 238 may be attached to aircraft 200. Automated identification technology tags 238 may be active 240 or passive 242. Active 240 automated identification technology tags 238 are powered by an internal battery. Passive 242 automated identification technology tags 238 operate without a separate power source and obtain power from a reader when interrogated by the reader to read information from automated identification technology tags 238 or to write information to automated identification technology tags 238.

Automated identification technology tags 238 may include radio frequency identification tags 244 and contact memory 246. Radio frequency identification tags 244 use radio frequency electromagnetic fields to transfer information when interrogated by a reader. The information stored in radio frequency identification tags 244 may be read from up to several yards away. Radio frequency identification tags 244 do not need to be within the line of sight of a reader to be interrogated and may be imbedded in number of components 206.

Contact memory 246 also may be referred to as touch memory. Contact memory 246 is an electronic identification device that may be packaged in a button-shaped container. Information in contact memory 246 is accessed when a touch probe for a reader is brought into contact with contact memory 246.

Component rework information 248 may be stored in automated identification technology tags 238. Component rework information 248 may include information identifying a history of rework of number of components 206.

Automated identification technology tags 238 may be attached to aircraft 200 by attachment structure 254. Attachment structure 254 may include any appropriate structure for attaching automated identification technology tags 238 to aircraft 200. For example, attachment structure 254 may include adhesive 256, other attachment structures 258, or a combination of structures for attaching automated identification technology tags 238 to aircraft 200. Attachment structure 254 may be tamper indicating 260. For example, without limitation, radio frequency identification tags 244 may be provided with tear-off provisions built in the tag so that when the tag is disturbed or damaged, the tag is disabled and rendered inoperative by the separation of the microchip from the antenna and packaging.

Figure 3:
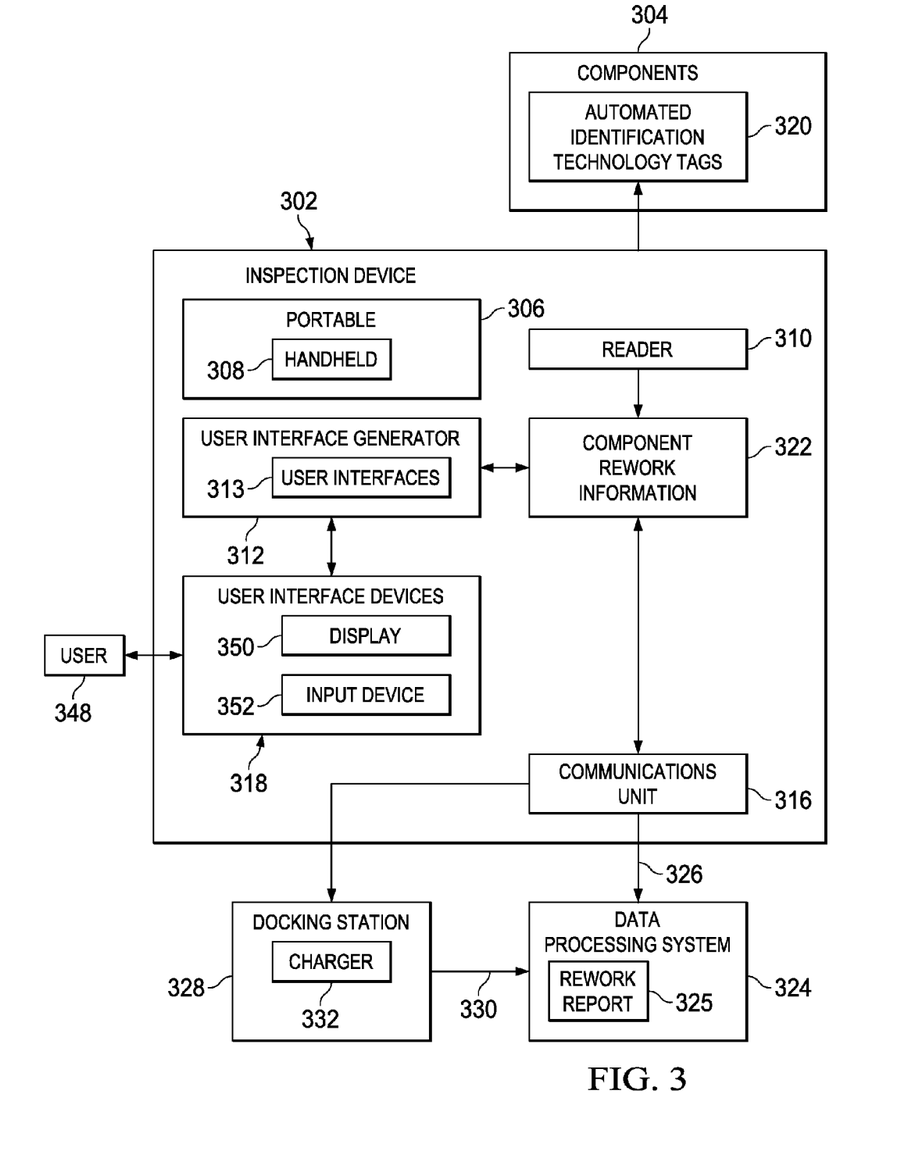
FIG. 3 is an illustration of a block diagram of an inspection device in accordance with an illustrative embodiment.

Turning now to FIG. 3, an illustration of a block diagram of an inspection device is depicted in accordance with an illustrative embodiment. In this example, inspection device 302 is an example of one implementation of portable inspection device 126 in FIG. 1. Inspection device 302 is configured to be used for maintaining components 304. For example, components 304 may be number of components 206 on aircraft 200 in FIG. 2.

Inspection device 302 may be portable 306. For example, inspection device 302 may be handheld 308. Inspection device 302 may include reader 310, user interface generator 312, communications unit 316, and user interface devices 318.

Automated identification technology tags 320 may include component rework information 322 for associated components 304. Reader 310 may be configured to read component rework information 322 from automated identification technology tags 320 and to write component rework information 322 to automated identification technology tags 320. For example, without limitation, reader 310 may be configured to write changes to component rework information 322 stored in automated identification technology tags 320.

Component rework information 322 may be provided from reader 310 to user interface generator 312. User interface generator 312 may be configured to generate user interfaces 313 for displaying component rework information to user 348 on user interface devices 318. User interface generator 312 also may be configured to generate user interfaces 313 to be displayed on user interface devices 318 for receiving component rework information 322 from user 348. User interface devices 318 may include display 350 for displaying information to user 348 and input device 352 for receiving input from user 348.

Component rework information 322 also may be provided from reader 310 to communications unit 316 for communication to data processing system 324. Component rework information 322 may be displayed on data processing system 324 as rework report 325.

Data processing system 324 may include any computer or other data processing system that may be separate from inspection device 302. For example, without limitation, data processing system 324 may be a data processing system operated by a maintenance entity. Communications unit 316 may be configured to send component rework information 322 and other information to data processing system 324 at any appropriate time via wireless connection 326. Alternatively, or additionally, communications unit 316 may be configured to send component rework information 322 and other information to data processing system 324 via docking station 328 when inspection device 302 is placed in docking station 328. Docking station 328 may be connected to data processing system 324 via connection 330. Connection 330 may be a wired or wireless connection.

Inspection device 302 may be a battery powered device. In this case, docking station 328 also may be configured to operate as charger 332 for charging a battery in inspection device 302 when inspection device 302 is placed in docking station 328.

The illustration of FIG. 3 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 4:
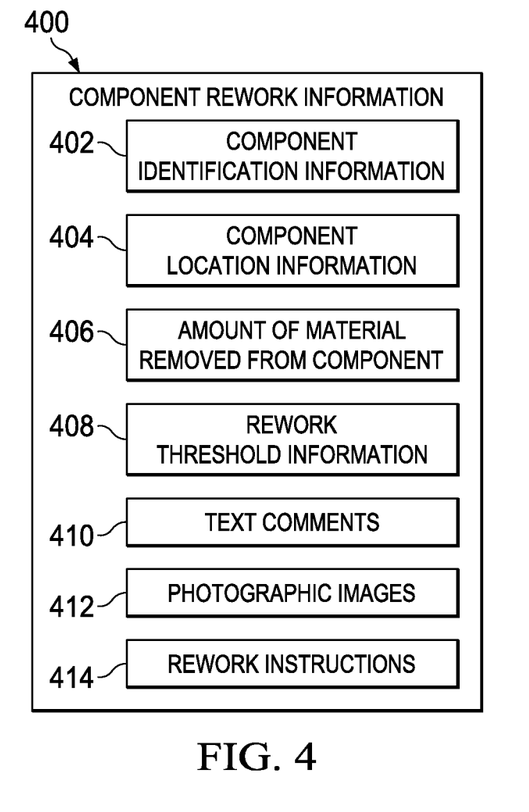
FIG. 4 is an illustration of a block diagram of component rework information in accordance with an illustrative embodiment.

Turning now to FIG. 4, an illustration of a block diagram of component rework information is depicted in accordance with an illustrative embodiment. In this example, component rework information 400 is an example of component rework information 248 in FIG. 2 and component rework information 322 in FIG. 3.

For example, without limitation, component rework information 400 may include component identification information 402, component location information 404, information identifying amount of material removed from component 406, rework threshold information 408, text comments 410, photographic images 412 of the component, and rework instructions 414

Figure 5:
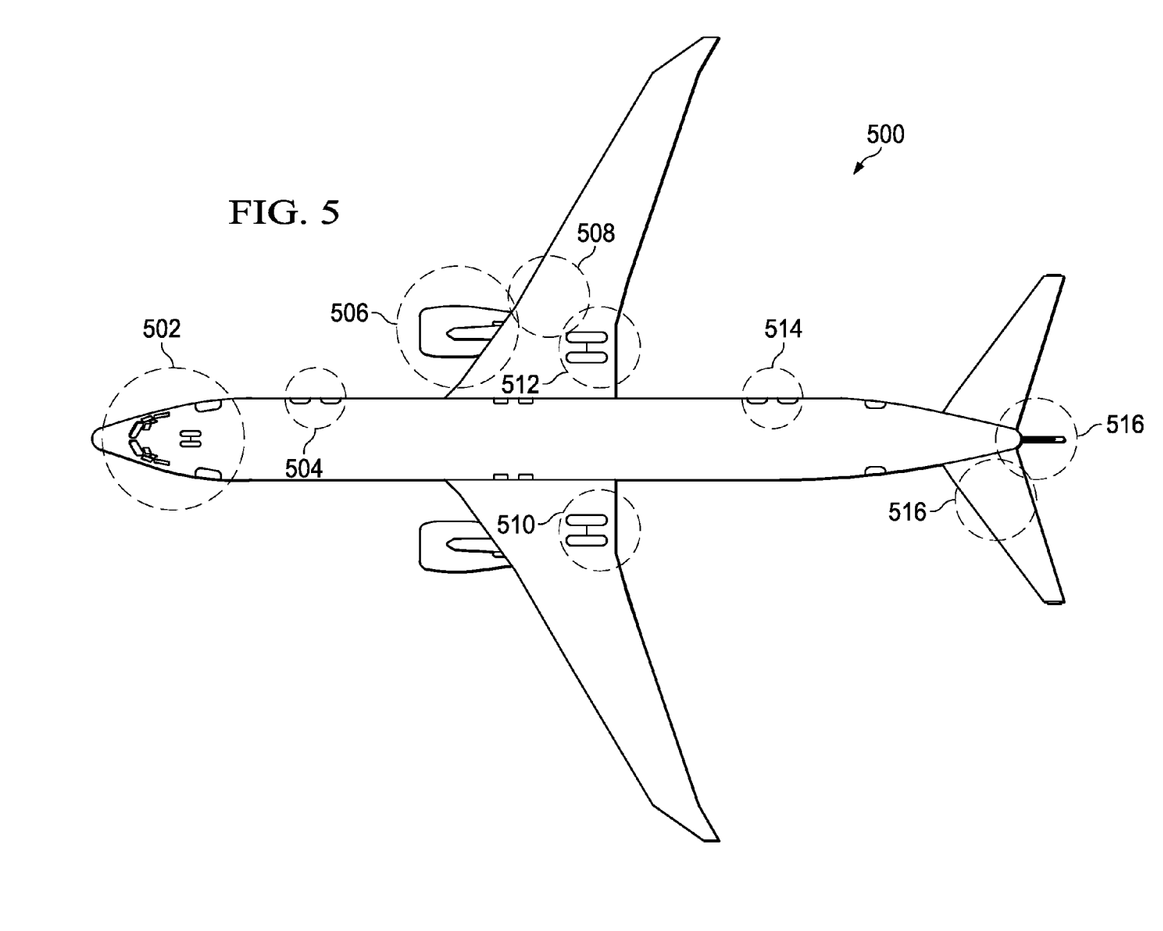
FIG. 5 is an illustration of an aircraft showing areas of the aircraft with components that may be reworked in accordance with an illustrative embodiment.

Turning now to FIG. 5, an illustration of an aircraft showing areas of the aircraft with components that may be reworked is depicted in accordance with an illustrative embodiment. In this example, aircraft 500 is an example of one implementation of aircraft 200 in FIG. 2.

Components of aircraft 500 may include nose gear structures in area 502, doors and surround structures in area 504, engine and pylon structures in area 506, slat tracks in area 508, main landing gear structures in area 510, flap tracks in area 512, cargo compartment structures in area 514, and tail structures in area 516. In accordance with an illustrative embodiment, a number of automated identification technology tags may be attached to aircraft 500 in areas 502, 504, 506, 508, 510, 512, 514 and 516. Such automated identification technology tags may include component rework information for various components of aircraft 500 in those areas.

Figure 6:
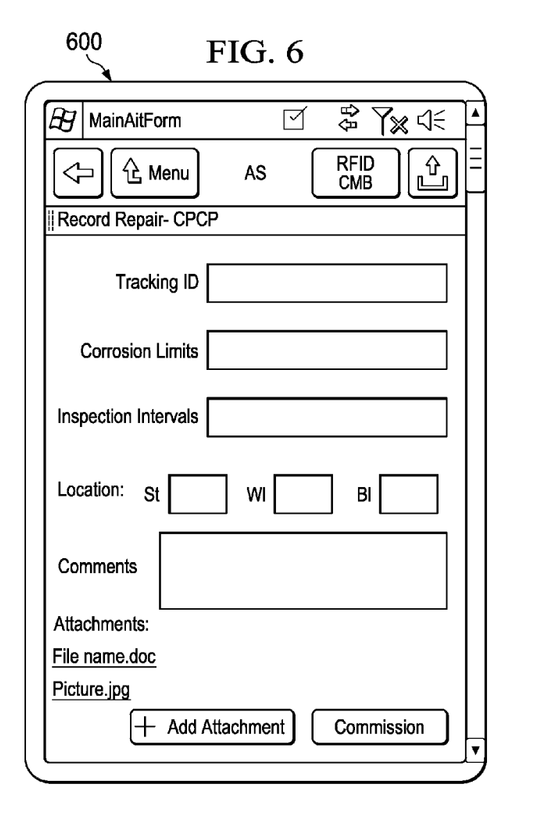
FIG. 6 is an illustration of a user interface for entering component rework information in accordance with an illustrative embodiment.

Turning now to FIG. 6, an illustration of a user interface for entering component rework information is depicted in accordance with an illustrative embodiment. In this example, user interface 600 is an example of one implementation of user interfaces 313 in FIG. 3.

Figure 7:
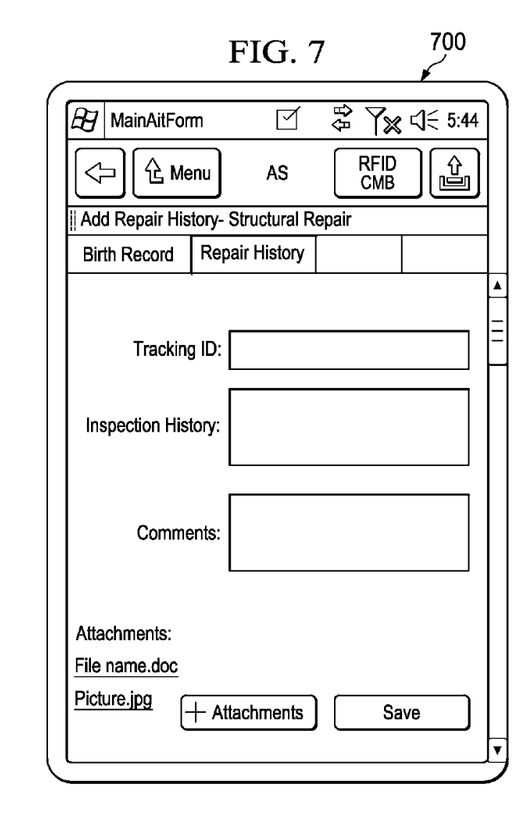
FIG. 7 is an illustration of a user interface for making changes to component rework information in accordance with an illustrative embodiment.

Turning now to FIG. 7, an illustration of a user interface for changing component rework information is depicted in accordance with an illustrative embodiment. In this example, user interface 700 is an example of another implementation of user interfaces 313 in FIG. 3.

Figure 8:
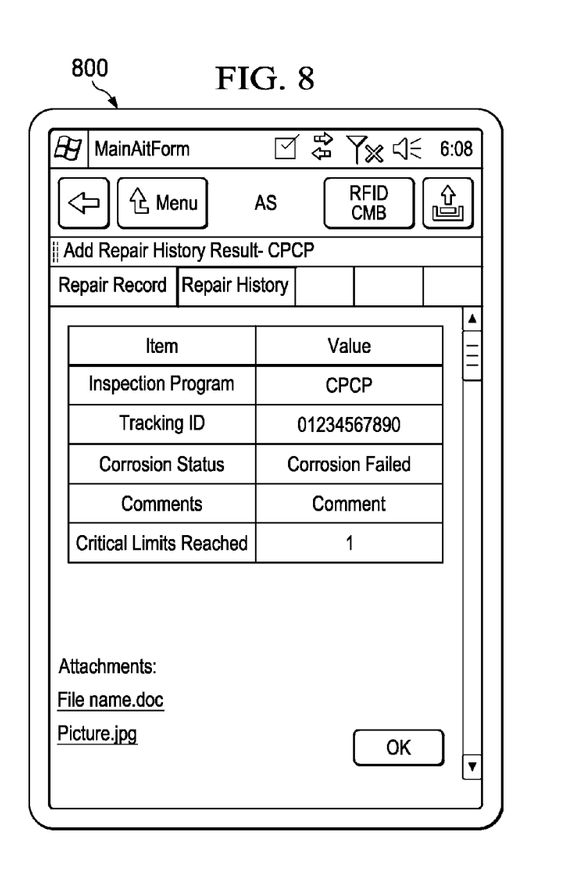
FIG. 8 is an illustration of a user interface displaying component rework information in accordance with an illustrative embodiment.

Turning now to FIG. 8, an illustration of a user interface displaying component rework information is depicted in accordance with an illustrative embodiment. In this example, user interface 800 is an example of another implementation of user interfaces 313 in FIG. 3.

Figure 9:
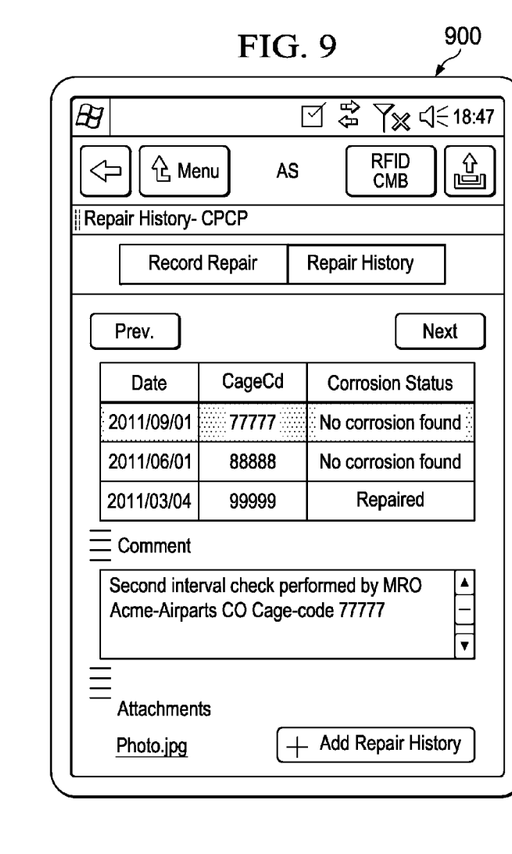
FIG. 9 is an illustration of a user interface displaying a review of component rework history information in accordance with an illustrative embodiment.

Turning now to FIG. 9, an illustration of a user interface displaying a review of component rework history information is depicted in accordance with an illustrative embodiment. In this example, user interface 900 is an example of another implementation of user interfaces 313 in FIG. 3.

Figure 10:
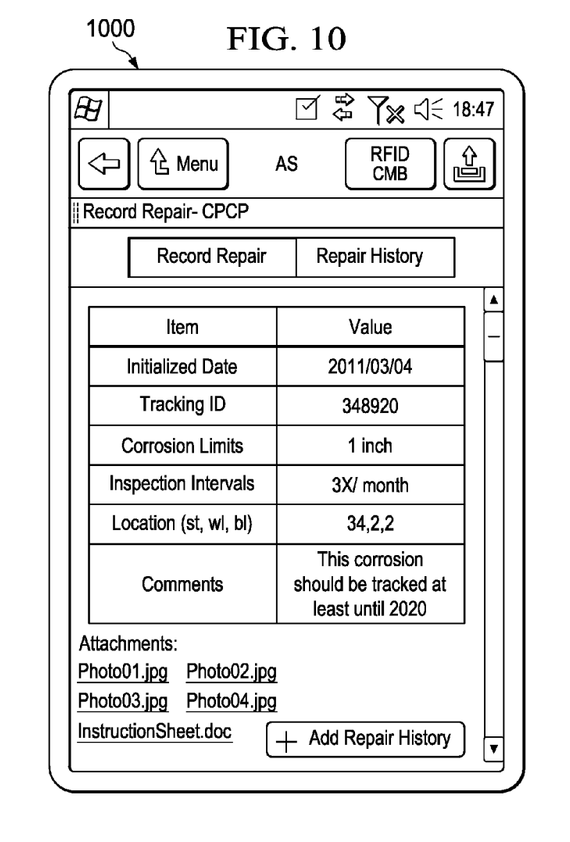
FIG. 10 is an illustration of a user interface displaying a component rework history record in accordance with an illustrative embodiment.

Turning now to FIG. 10, an illustration of a user interface displaying a component rework history record is depicted in accordance with an illustrative embodiment. In this example, user interface 1000 is an example of another implementation of user interfaces 313 in FIG. 3.

Figure 11:
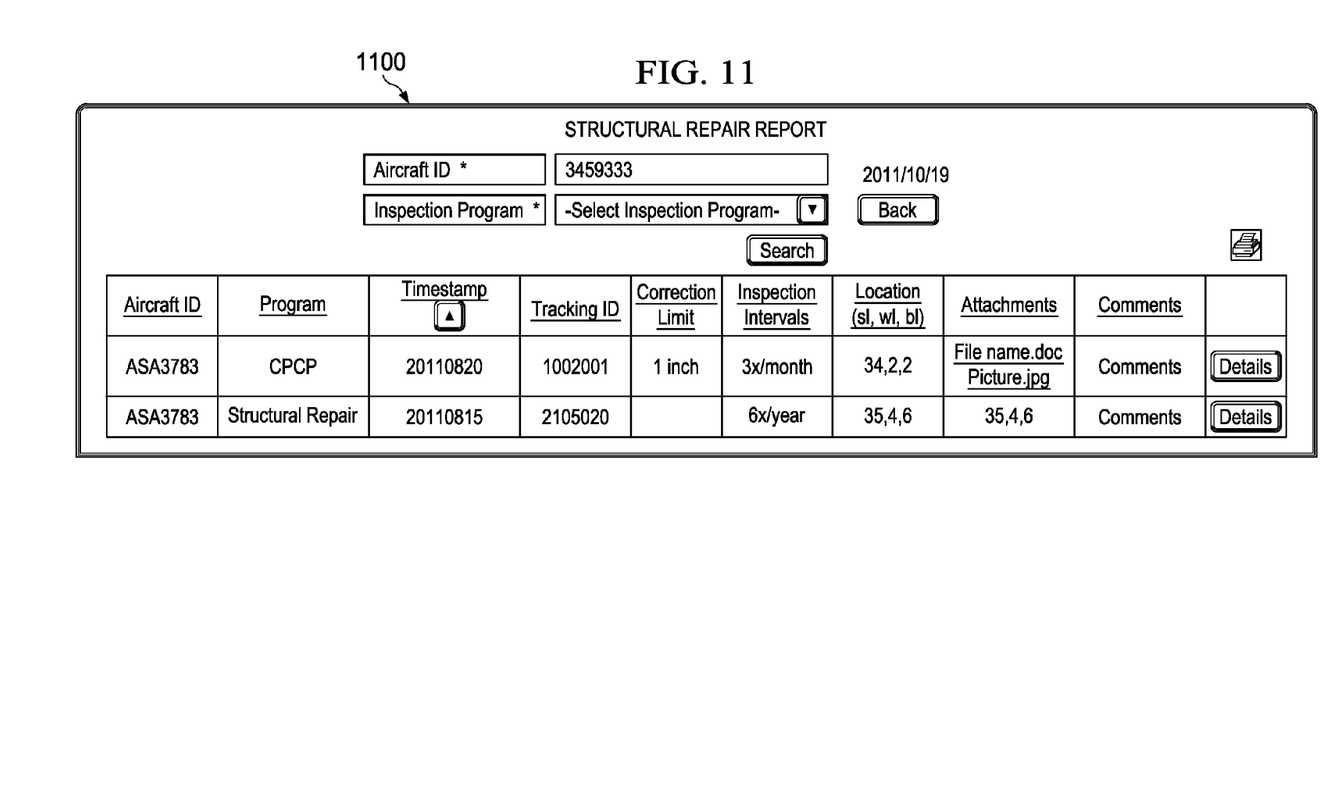
FIG. 11 is an illustration of a user interface displaying a rework report in accordance with an illustrative embodiment.

Turning now to FIG. 11, an illustration of a user interface displaying a rework report is depicted in accordance with an illustrative embodiment. In this example, user interface 1100 is an example of one implementation of rework report 325 in FIG. 3.

Figures 12, 13:
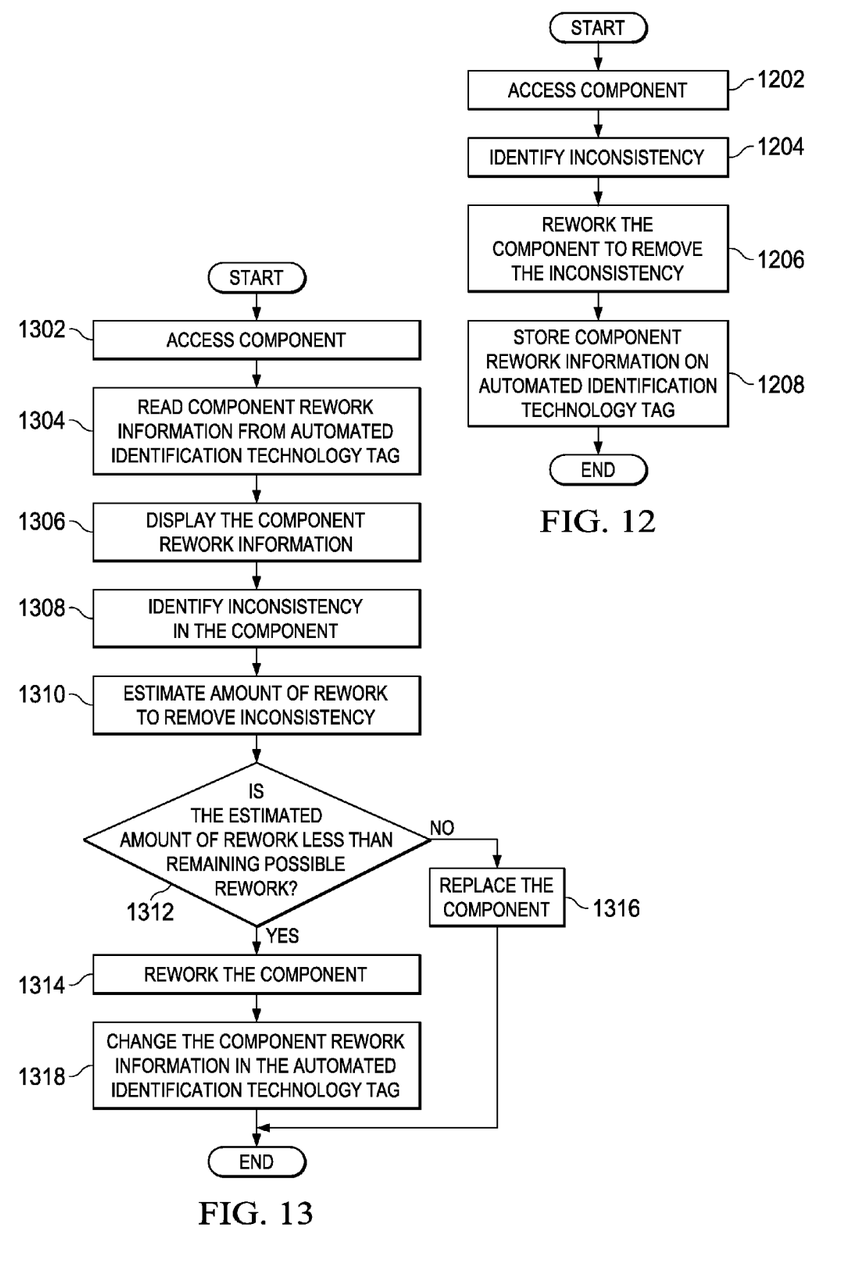
FIG. 12 is an illustration of a flowchart of a process for reworking a component of a vehicle in accordance with an illustrative embodiment.
FIG. 13 is an illustration of a flowchart of another process for reworking a component of a vehicle in accordance with an illustrative embodiment.

Turning now to FIG. 12, an illustration of a flowchart of a process for reworking a component of a vehicle is depicted in accordance with an illustrative embodiment. For example, this process may be implemented using inspection device 302 in FIG. 3.

The process begins by accessing a component on the vehicle (operation 1202). An inconsistency in the component is identified (operation 1204). The component may be reworked to remove the inconsistency (operation 1206). Component rework information describing the reworked component is then saved in an automated identification technology tag attached to the vehicle (operation 1208), with the process terminating thereafter.

Turning now to FIG. 13, an illustration of a flowchart of another process for reworking a component of a vehicle is depicted in accordance with an illustrative embodiment. This process may be performed for reworking a component a subsequent time after the process in FIG. 12.

The process begins by accessing the component (operation 1302). Component rework information is read from an automated identification technology tag attached to the vehicle (operation 1304). The component rework information is displayed (operation 1306). The displayed component rework information may include an indication of the remaining possible rework of the component to verify that the component has not been reworked beyond proscribed limits.

An inconsistency in the component is identified (operation 1308). An amount of rework to remove the inconsistency is estimated (operation 1310). It then may be determined whether the estimated amount of rework to remove the inconsistency is less than the remaining possible rework indicated in the component rework information (operation 1312).

If it is determined that the estimated amount of rework to remove the inconsistency is less than the remaining possible rework, the component may be reworked (operation 1314). If it is determined that the estimated amount of rework to remove the inconsistency is not less than the remaining possible rework the component may be replaced (operation 1316). In either case, the component rework information in the automated identification technology tag may be changed (operation 1318) to update the component rework information to indicate that the component was reworked or replaced, with the process terminating thereafter.

Figure 14:
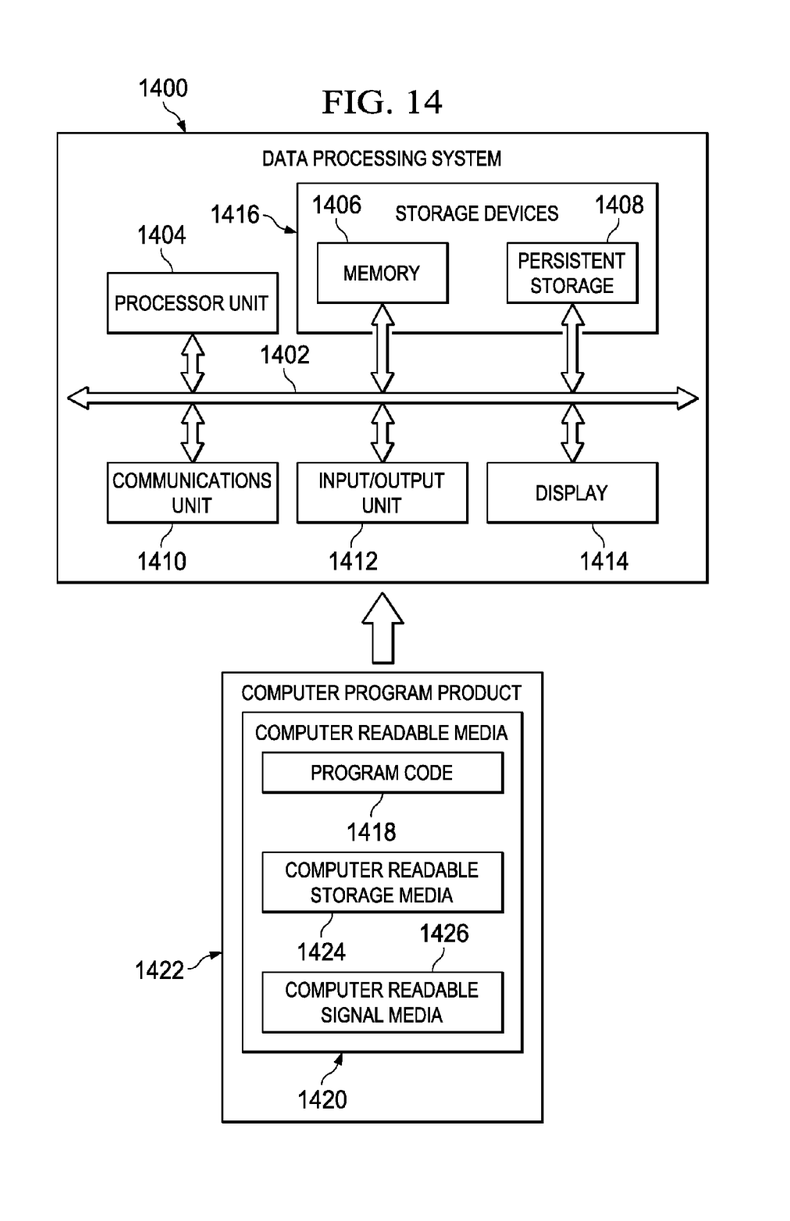
FIG. 14 is an illustration of a block diagram of a data processing system in accordance with an illustrative embodiment.

Turning now to FIG. 14, an illustration of a block diagram of a data processing system is depicted in accordance with an illustrative embodiment. In this example, data processing system 1400 is an example of one implementation of a data processing system for implementing inspection device 302 in FIG. 3.

In this illustrative example, data processing system 1400 includes communications fabric 1402. Communications fabric 1402 provides communications between processor unit 1404, memory 1406, persistent storage 1408, communications unit 1410, input/output unit 1412, and display 1414. Memory 1406, persistent storage 1408, communications unit 1410, input/output unit 1412, and display 1414 are examples of resources accessible by processor unit 1404 via communications fabric 1402.

Processor unit 1404 serves to run instructions for software that may be loaded into memory 1406. Processor unit 1404 may be a number of processors, a multi-processor core, or some other type of processor, depending on the particular implementation. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and other suitable information either on a temporary basis or a permanent basis. Storage devices 1416 also may be referred to as computer readable storage devices in these examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer-implemented instructions, which may be located in a memory, such as memory 1406.

These instructions are referred to as program instructions, program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these examples. In one example, computer readable media 1420 may be computer readable storage media 1424 or computer readable signal media 1426.

Computer readable storage media 1424 may include, for example, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400. In some instances, computer readable storage media 1424 may not be removable from data processing system 1400.

In these examples, computer readable storage media 1424 is a physical or tangible storage device used to store program code 1418 rather than a medium that propagates or transmits program code 1418. Computer readable storage media 1424 is also referred to as a computer readable tangible storage device or a computer readable physical storage device. In other words, computer readable storage media 1424 is a media that can be touched by a person.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

In other words, the communications link and/or the connection may be physical or wireless in the illustrative examples.

In some illustrative embodiments, program code 1418 may be downloaded over a network to persistent storage 1408 from another device or data processing system through computer readable signal media 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different illustrative embodiments may be implemented in a data processing system including components in addition to and/or in place of those illustrated for data processing system 1400. Other components shown in FIG. 14 can be varied from the illustrative examples shown. The different embodiments may be implemented using any hardware device or system capable of running program code. As one example, data processing system 1400 may include organic components integrated with inorganic components and/or may be comprised entirely of organic components excluding a human being. For example, a storage device may be comprised of an organic semiconductor.

In another illustrative example, processor unit 1404 may take the form of a hardware unit that has circuits that are manufactured or configured for a particular use. This type of hardware may perform operations without needing program code to be loaded into a memory from a storage device to be configured to perform the operations.

For example, when processor unit 1404 takes the form of a hardware unit, processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1418 may be omitted, because the processes for the different embodiments are implemented in a hardware unit.

In still another illustrative example, processor unit 1404 may be implemented using a combination of processors found in computers and hardware units. Processor unit 1404 may have a number of hardware units and a number of processors that are configured to run program code 1418. With this depicted example, some of the processes may be implemented in the number of hardware units, while other processes may be implemented in the number of processors.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system.

Additionally, communications unit 1410 may include a number of devices that transmit data, receive data, or both transmit and receive data. Communications unit 1410 may be, for example, a modem or a network adapter, two network adapters, or some combination thereof. Further, a memory may be, for example, memory 1406, or a cache, such as that found in an interface and memory controller hub that may be present in communications fabric 1402.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for reworking a component on a vehicle, comprising:
    reading, by a processor, component rework information from an automated identification technology tag attached to the vehicle, wherein the component rework information comprises information identifying a history of rework of the component, wherein the component rework information comprises rework threshold information indicating an amount of remaining possible rework of the component and further comprising: identifying, by the processor, an inconsistency on the component; determining, by the processor, an estimated amount of rework to remove the inconsistency; ordering, by the processor, a reworking of the component in response to a determination that the estimated amount of rework to remove the inconsistency is less than the amount of remaining possible rework of the component; and ordering, by the processor, a replacing of the component in response to a determination that the estimated amount of rework to remove the inconsistency is more than the amount of remaining possible rework of the component; and
    displaying, by the processor, the component rework information on a user interface.

2. The method of claim 1, wherein the automated identification technology tag is selected from a radio frequency identification tag and a contact memory.

3. The method of claim 1, wherein the automated identification technology tag is attached to the vehicle at a location on the vehicle selected from the component and an area of the vehicle including the component.

4. The method of claim 1, wherein the component rework information comprises information selected from: information identifying the component, information identifying a location of the component on the vehicle, information identifying an amount of material removed from the component if previously reworked, text comments, and photographic images of the component.

5. The method of claim 1, further comprising updating, by the processor, the component rework information in the automated identification technology tag after reworking the component or replacing the component.

6. The method of claim 1, wherein reading the component rework information and displaying the component rework information is performed by an inspection device that is portable.

7. The method of claim 1, wherein the vehicle is an aircraft and the component is a component on the aircraft.

8. A method for reworking a component on a vehicle, comprising:
    in response to identifying an inconsistency on the component, retrieving, by a processor component rework information on an automated identification technology tag attached to the vehicle, wherein the component rework information comprises information describing the reworking of the component to remove the inconsistency;
    ordering, by the processor, a reworking of the component in response to a determination that an estimated amount of rework to remove the inconsistency is less than an amount of remaining possible rework of the component;
    ordering, by the processor, a replacing of the component in response to a determination that the estimated amount of rework to remove the inconsistency is more than the amount of remaining possible rework of the component; and
    in response to the reworking the component to remove the inconsistency, updating, by the processor, the component rework information on the automated identification technology tag attached to the vehicle.

9. The method of claim 8, wherein the automated identification technology tag is selected from a radio frequency identification tag and a contact memory.

10. The method of claim 8, wherein updating the component rework information on the automated identification technology tag comprises attaching the automated identification technology tag to the vehicle at a location on the vehicle selected from the component and an area of the vehicle including the component.

11. The method of claim 8, wherein the component rework information comprises information selected from information identifying an amount of material removed from the component during the reworking of the component, text comments, and photographic images of the component.

12. The method of claim 8 further comprising:
    reading the component rework information from the automated identification technology tag, wherein the component rework information comprises rework threshold information indicating an amount of remaining possible rework of the component; and
    determining an estimated amount of rework to remove the inconsistency.

13. The method of claim 8, wherein storing the component rework information on the automated identification technology tag is performed by an inspection device that is portable.

14. The method of claim 8, wherein the vehicle is an aircraft and the component is a component on the aircraft.

15. An apparatus, comprising:
    a memory having computer usable instructions encoded thereon;
    a processor;

a reader configured to read component rework information from an automated identification technology tag attached to a vehicle, to determine an estimated amount of rework to remove the inconsistency, to order a reworking of the component in response to a determination that the estimated amount of rework to remove the inconsistency is less than the amount of remaining possible rework of the component, to order a replacing of the component in response to a determination that the estimated amount of rework to remove the inconsistency is more than the amount of remaining possible rework of the component, and to write changes to the component rework information to the automated identification technology tag attached to the vehicle, wherein the component rework information comprises information identifying a history of rework of the component; and a user interface configured to display the component rework information and to receive the changes to the component rework information from a user.

16. The apparatus of claim 15, wherein the automated identification technology tag is selected from a radio frequency identification tag and a contact memory.

17. The apparatus of claim 15, wherein the automated identification technology tag is attached to the vehicle at a location on the vehicle selected from the component and an area of the vehicle including the component.

18. The apparatus of claim 15, wherein the component rework information comprises information selected from: information identifying the component, information identifying a location of the component on the vehicle, information identifying an amount of material removed from the component if previously reworked, rework threshold information indicating an amount of remaining possible rework of the component, text comments, and photographic images of the component.

19. The apparatus of claim 15, wherein the vehicle is an aircraft, the component is a component on the aircraft, and the apparatus is a portable inspection device.

\* \* \* \* \*